Patented Sept. 24, 1940

2,215,553

UNITED STATES PATENT OFFICE 2,215,553

METHOD OF MAKING FIBER-RUBBER PRODUCTS

Clifford S. Johnson, Naugatuck, Conn., assignor to United States Rubber Company, New York, N. Y., a corporation of New Jersey No Drawing. Application April 7, 1939, Serial No. 266,531

8 Claims. (Cl. 92—21)

This invention relates to a method of making fiber-rubber products, and more particularly to a method wherein dispersed rubber particles are deposited on the fibers in an aqueous suspension of the fibers having an acid reaction.

In one process of making fiber-rubber products today, latex is added to a fiber slurry of paper making fibers in a paper beater, or the machine chest of a paper machine, or at some other stage of paper manufacture prior to formation of the sheet from the fibers, and after the latex has thus been mixed with the pulp slurry, the rubber particles are deposited or coagulated on the fibers by the addition of alum or other acidic material to the mixture, after which the fibers are sheeted in the usual way. Commonly, such slurries of paper making fibers have a neutral or alkaline reaction and hence the latex compounds can be mixed therewith without special precautions, and on addition of alum the rubber particles will coagulate and deposit uniformly on the fibers. There are some fiber slurries, however, that have an acid reaction when they are used in papermaking and other processes, and when ordinary latex compounds are added to such slurries, the coagulation is difficult to control, the rubber particles coagulating spontaneously and the rubber depositing in large particles instead of being distributed uniformly on the pulp. A sheet produced from such a pulp suspension where the rubber has coagulated in large particles is wholly undesirable commercially. One such type of slurry is that made from the pulp of high resin content wood, such as pine from the southern part of the United States. The processes developed for pulping such wood yield pulps that in aqueous suspension have an acid reaction, generally with pH below 6.5.

I have found that if latex is added to an aqueous suspension of fibers having an acid reaction in the presence of a small amount of a condensation product of a straight chain alcohol having at least 6 carbon atoms with a polyglycol compound containing at least 4 ethenoxy groups, the rubber particles will not coagulate at room temperature but will uniformly deposit on the fibers when the temperature of the fiber suspension is raised. These condensation products which protect the rubber particles at room temperature become inactive as a protective for the rubber particles at elevated temperature and cause the rubber particles to deposit or coagulate on the fibers on heating. An example of such a condensation product is the commercial "surface active agent" known under the trade name of "Emulphor-O," believed to be the condensation product of tetraethylene glycol with oleyl alcohol. These condensation products further leave no putrescible residue in the dried fiber-rubber product as may be the case when heat-coagulable proteid colloids are used as the protective for the rubber particles in an acid fiber slurry.

The condensation product, such as "Emulphor-O" is preferably compounded in the latex, although it may be added to the fiber suspension with the latex, or added to the fiber suspension before mixing with the latex. The amount of the condensation product which should be incorporated with such latex varies somewhat with the pH of the fiber suspension, but in general about 3 parts of the condensation product per 100 parts of rubber in the latex are sufficient. However, as much as 6 parts of "Emulphor-O" per 100 parts of rubber have been used in the case of fiber suspensions with very low pH, and as little as 1 part per 100 parts of rubber has been used successfully in some fiber suspensions having a pH not much below 6.5. The amount of latex added to the fiber suspension depends entirely on the rubber content desired in the final fiber-rubber product. In making so-called "latex paper," the amount of latex added to the pulp slurry will usually be an amount that will give 1 to 10% of rubber on the finished product. In the manufacture of so-called "artificial leather," the amount of latex added to the fiber suspension may be such as to give a fiber-rubber product containing as high as 35% or more of rubber.

The temperature required to effect coagulation depends primarily on the pH of the fiber suspension. In general, the lower the pH, the lower is the temperature required to effect coagulation. For example, a latex compound was made up according to the following formula:

|  | Parts by weight— (including water content) |
|---|---|
| 60% concentration creamed latex | 167 |
| 10% aqueous solution of "Emulphor-O" | 30 |
| 60% colloidal sulphur paste (aqueous) | 5.1 |
| 37½% colloidal zinc oxide paste (aqueous) | 5.3 |
| 26% accelerator aqueous emulsion | 1.9 |
| 30% antioxidant aqueous emulsion | 1.7 |

Various amounts of the above latex composition up to 10 parts of rubber per 100 parts of the pulp solids were added at room temperature (about 23° C.) to different pulp slurries made from pine from the southern part of the United States. In one typical case where the slurry had a pH of 3.9, the rubber coagulated in extremely finely divided particles evenly distributed on the pulp when the slurry was warmed to 45° C. In another case where the slurry had a pH of 5.5, it was necessary to heat to 75° C. before deposition of the rubber on the fibers occurred. All the rubber particles deposited on the fibers and the thus treated fibers were sheeted out on conventional paper making machinery and dried. It may readily be seen that the temperature of mixing the latex with the fiber suspension may thus be room temperature or any temperature that is less than the temperature at which the condensation product ceases to protect the rubber particles in the fiber suspension, and the temperature of heating to deposit the rubber on the fibers need be only that at which the rubber particles cease to be protected.

The present invention may readily be applied to aqueous suspensions of various fibers having an acid reaction, such as wood and other paper making fibers, asbestos fibers, tanned leather fibers, and also to aqueous suspensions of fibers which tend to coagulate latex even though they are not acid in aqueous suspensions, as for example, fibers containing polyvalent metal salts, as from a mordanting or other previous treatment. The latex compound may be added to an aqueous suspension of fibers in a paper making or other process, and after deposition of rubber on the fibers according to the present invention, the thus treated fibers may be separated from the liquid medium of the fiber suspension in any manner to produce the desired type of fiber-rubber product.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of making a fiber-rubber product which comprises mixing with an aqueous suspension of wood fibers a fluid latex composition in the presence of a condensation product of a straight chain aliphatic alcohol having at least 6 carbon atoms with a polyglycol compound containing at least 4 ethenoxy groups which stabilizes the rubber particles in the mixture at room temperature but not at elevated temperature, the temperature of the fiber suspension being below that at which the rubber particles will deposit on the fibers, heating the mixture to such a temperature as will cause the rubber particles to deposit on the fibers, and separating the thus treated fibers from the liquid medium of the fiber suspension.

2. The method of making a fiber-rubber product which comprises mixing with an aqueous suspension of wood fibers a fluid latex composition in the presence of a condensation product of tetraethylene glycol with oleyl alcohol which stabilizes the rubber particles in the mixture at room temperature but not at elevated temperature, the temperature of the fiber suspension being below that at which the rubber particles will deposit on the fibers, heating the mixture to such a temperature as will cause the rubber particles to deposit on the fibers, and separating the thus treated fibers from the liquid medium of the fiber suspension.

3. The method of making a fiber-rubber product which comprises mixing with an aqueous suspension of wood fibers a fluid latex composition in the presence of up to 6 parts of a condensation product of a straight chain aliphatic alcohol having at least 6 carbon atoms with a polyglycol compound containing at least 4 ethenoxy groups per 100 parts of rubber at such a temperature that the dispersion of rubber particles in the mixture will not coagulate on the fibers, heating the mixture to such a temperature as will cause the rubber particles to deposit on the fibers, and separating the thus treated fibers from the liquid medium of the fiber suspension.

4. The method of making a fiber rubber product which comprises mixing with an aqueous suspension of wood fibers a fluid latex composition in the presence of up to 6 parts of a condensation product of tetraethylene glycol with oleyl alcohol per 100 parts of rubber at such a temperature that the dispersed rubber particles in the mixture will not coagulate on the fibers, heating the mixture to such a temperature as will cause the rubber particles to deposit on the fibers, and separating the thus treated fibers from the liquid medium of the fiber suspension.

5. The method of making a fiber-rubber product which comprises mixing with an aqueous suspension of wood fibers at a pH less than 6.5 a fluid latex composition in the presence of a condensation product of a straight chain aliphatic alcohol having at least 6 carbon atoms with a polyglycol compound containing at least 4 ethenoxy groups, which stabilizes the rubber particles in the mixture at room temperature but not at elevated temperature, the temperature of the fiber suspension mixture being below that at which the rubber particles will deposit on the fibers, heating the mixture to such a temperature as will cause the rubber particles to deposit on the fibers, and separating the thus treated fibers from the liquid medium of the fiber suspension.

6. The method of making a fiber-rubber product which comprises mixing with an aqueous suspension of wood fibers at a pH less than 6.5 a fluid latex composition in the presence of a condensation product of tetraethylene glycol with oleyl alcohol which stabilizes the rubber particles in the mixture at room temperature but not at elevated temperature, the temperature of the fiber suspension being below that at which the rubber particles will deposit on the fibers, heating the mixture to such a temperature as will cause the rubber particles to deposit on the fibers, and separating the thus treated fibers from the liquid medium of the fiber suspension.

7. The method of making a fiber-rubber product which comprises mixing with an aqueous suspension of wood fibers at a pH less than 6.5 a fluid latex composition in the presence of up to 6 parts of a condensation product of a straight chain aliphatic alcohol having at least 6 carbon atoms with a polyglycol compound containing at least 4 ethenoxy groups, per 100 parts of rubber at such a temperature that the dispersed rubber particles in the mixture will not coagulate on the fibers, the temperature of the mixture being below that at which the rubber particles will deposit on the suspended fibers, heating the mixture to such a temperature as will cause the rubber particles to deposit on the fibers, and separating the thus treated fibers from the liquid medium of the fiber suspension.

8. The method of making a fiber-rubber product which comprises mixing with an aqueous suspension of wood fibers at a pH less than 6.5 a fluid latex composition in the presence of up to 6 parts of a condensation product of tetraethylene glycol with oleyl alcohol per 100 parts of rubber at such a temperature that the dispersed rubber particles in the mixture will not coagulate on the fibers, heating the mixture to such a temperature as will cause the rubber particles to deposit on the fibers, and separating the thus treated fibers from the liquid medium of the fiber suspension.

CLIFFORD S. JOHNSON.